United States Patent
Liu et al.

(10) Patent No.: US 8,668,896 B2
(45) Date of Patent: Mar. 11, 2014

(54) METHOD FOR MAKING TWISTED CARBON NANOTUBE WIRE

(75) Inventors: Kai Liu, Beijing (CN); Rui-Feng Zhou, Beijing (CN); Ying-Hui Sun, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 237 days.

(21) Appl. No.: 12/590,661

(22) Filed: Nov. 12, 2009

(65) Prior Publication Data
US 2011/0020210 A1   Jan. 27, 2011

(30) Foreign Application Priority Data
Jul. 21, 2009   (CN) .......................... 2009 1 0109047

(51) Int. Cl.
*D01F 9/12*   (2006.01)
(52) U.S. Cl.
USPC ...................................... 423/447.1; 977/742
(58) Field of Classification Search
USPC .......................................... 423/447.1–447.3
See application file for complete search history.

(56) References Cited

U.S. PATENT DOCUMENTS

| | | | |
|---|---|---|---|
| 7,045,108 B2 * | 5/2006 | Jiang et al. ................. | 423/447.2 |
| 7,704,480 B2 * | 4/2010 | Jiang et al. ................. | 423/447.2 |
| 7,967,655 B2 * | 6/2011 | Wei et al. ......................... | 445/51 |
| 7,988,893 B2 * | 8/2011 | Liao et al. ...................... | 264/103 |
| 2007/0166223 A1 * | 7/2007 | Jiang et al. ................. | 423/447.1 |
| 2007/0237959 A1 * | 10/2007 | Lemaire ....................... | 428/408 |
| 2008/0170982 A1 * | 7/2008 | Zhang et al. ............... | 423/447.3 |
| 2009/0075545 A1 | 3/2009 | Lashmore et al. | |

FOREIGN PATENT DOCUMENTS

| | | |
|---|---|---|
| JP | 2008-523254 | 7/2008 |
| TW | 312337 | 7/2009 |
| TW | 341878 | 7/2009 |
| WO | WO2009029341 | 3/2009 |

OTHER PUBLICATIONS

Definition of Section, accessed online at http://www.merriam-webster.com/dictionary/section on Dec. 12, 2013.*

* cited by examiner

*Primary Examiner* — Daniel C McCracken
(74) *Attorney, Agent, or Firm* — Altis Law Group, Inc.

(57) ABSTRACT

The present invention relates to a method for making a twisted carbon nanotube wire. Two opposite ends of the at least one carbon nanotube film is clamped by two clamps. The two clamps is pulled along two reversed directions to stretch the at least one carbon nanotube film. The at least one carbon nanotube film is twisted by rotating the two clamps while the at least one carbon nanotube film is in a straightening state.

19 Claims, 9 Drawing Sheets

METHOD FOR MAKING TWISTED CARBON NANOTUBE WIRE

CROSS-REFERENCE TO RELATED APPLICATIONS

This application claims all benefits accruing under 35 U.S.C. §119 from Chinese Patent Application No. 200910109047.0, filed on Jul. 21, 2009, in the Chinese Intellectual Property Office, the contents of which are hereby incorporated by reference.

BACKGROUND

1. Technical Field

The present disclosure relates to methods for making the carbon nanotube structures, particularly, to a method for making the twisted carbon nanotube wire.

2. Description of Related Art

Carbon nanotubes are tubules of carbon generally having a diameter of 0.5 to 100 nanometers, and composed of a number of coaxial cylinders of graphite sheets. Carbon nanotubes have interesting and potentially useful thermal, electrical and mechanical properties, and have recently attracted a great deal of attention for use in different applications such as field emitters, gas storage and separation, chemical sensors, and high strength composites.

However, the main obstacle to actual application of carbon nanotubes is their difficulty to process due to the powder form of the carbon nanotube products. Therefore, forming separate and tiny carbon nanotubes into manipulable carbon nanotube structures is necessary.

Recently, as disclosed by patent application US20080170982 to Zhang et al., a twisted carbon nanotube wire has been fabricated. As shown in FIG. 2 of US20080170982, a carbon nanotube structure is drawn from a carbon nanotube array and directly twisted at the same time to form a twisted carbon nanotube wire. During twisting of the carbon nanotube structure, more and more carbon nanotubes are drawn from the carbon nanotube array, and a twisted carbon nanotube wire is formed and extended.

However, in the drawing and twisting process, the twisted carbon nanotube wire is joined with the carbon nanotube array, such that the carbon nanotube array can provide relatively weak pulling force (i.e., the van der Waals attractive force between adjacent carbon nanotubes). Therefore, the achieved twisted carbon nanotube wire may have clearances between adjacent carbon nanotubes due to the curve of the carbon nanotubes formed, and the density and tensile strength of the twisted carbon nanotube wire are relatively small.

What is needed, therefore, is to provide a twisted carbon nanotube wire having relatively high density and tensile strength and method for making the same.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
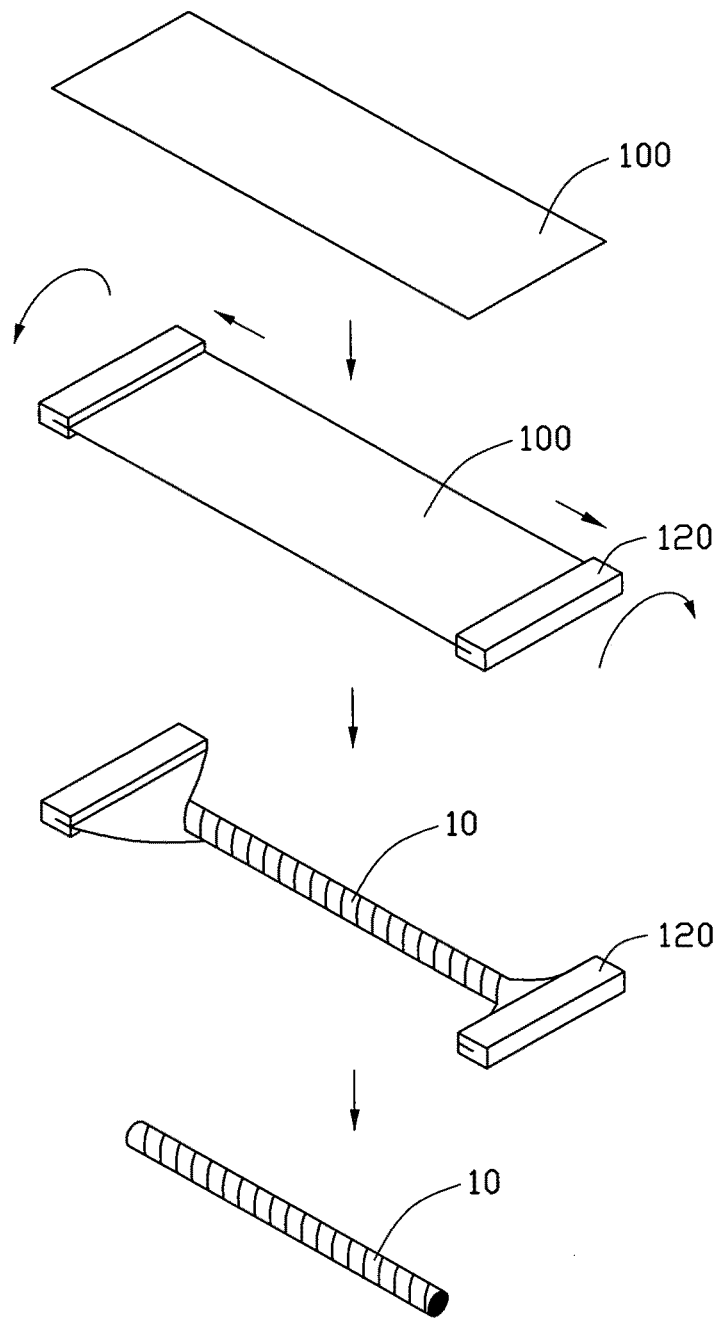
FIG. 1 is a schematic structural view of a first embodiment of a method for making a twisted carbon nanotube wire.

Referring to FIG. 1, according to a first embodiment, a method for making a twisted carbon nanotube wire 10 includes steps of:

S11 providing at least one carbon nanotube film 100 and two fixing elements 120;

S12 clamping the carbon nanotube film 100 by the two fixing elements 120 at two opposite ends of the carbon nanotube film 100 along a length direction of the carbon nanotube film 100;

S13 applying two different direction pulling forces on the two fixing elements 120 to draw the carbon nanotube film 100 along the length direction of the carbon nanotube film 100; and S14 rotating the two fixing elements 120, thereby twisting the carbon nanotube film 100 while the carbon nanotube film 100 is in a stretched state.

Figure 2:
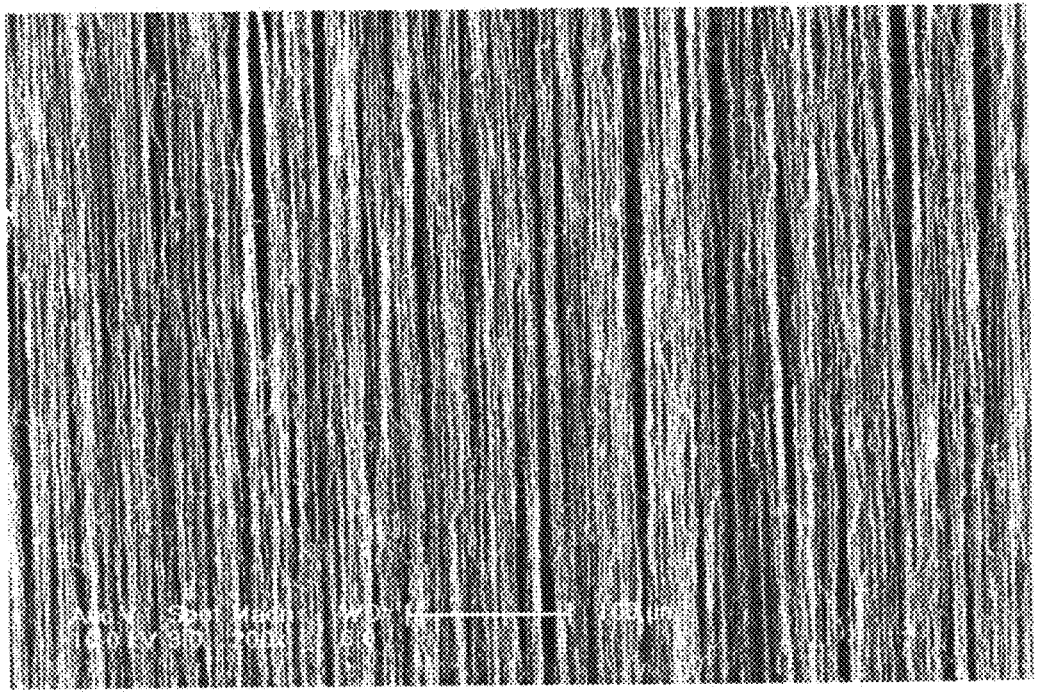
FIG. 2 shows a Scanning Electron Microscope (SEM) image of a carbon nanotube film drawn from a carbon nanotube array.
Figure 3:
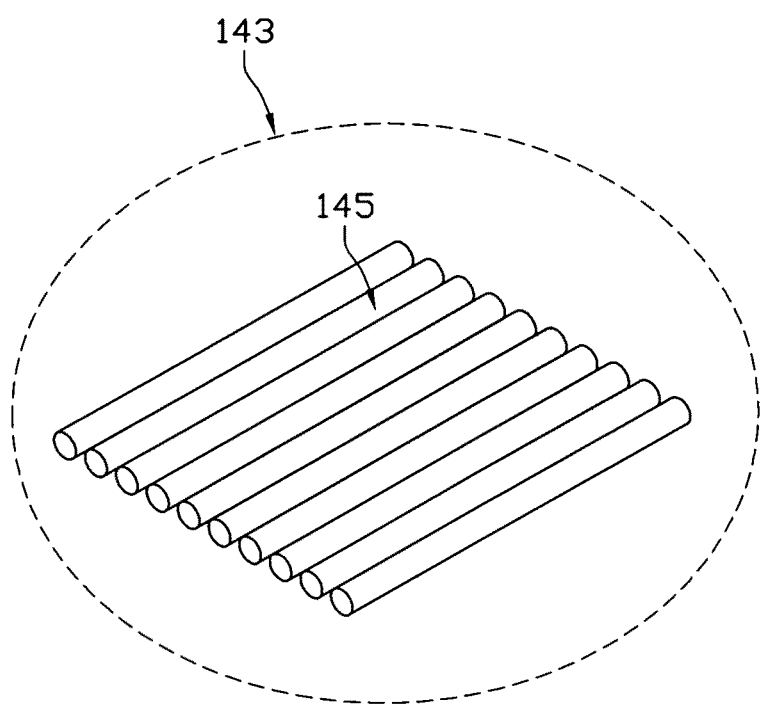
FIG. 3 is a schematic structural view of a carbon nanotube segment.

In step S11, the carbon nanotube film 100 includes a plurality of carbon nanotubes uniformly distributed therein, and aligned substantially along a length direction of the carbon nanotube film 100. Referring also to FIG. 2, more specifically, the carbon nanotube film 100 includes a plurality of successive and oriented carbon nanotubes joined end-to-end by van der Waals attractive force therebetween and substantially parallel to a surface of the carbon nanotube film 100. Referring also to FIG. 3, the carbon nanotube film 100 includes a plurality of successively oriented carbon nanotube segments 143 joined end-to-end by van der Waals attractive force therebetween. Each carbon nanotube segment 143 includes a plurality of carbon nanotubes 145 substantially parallel to each other, and combined by van der Waals attractive force therebetween. As can be seen in FIG. 2, some variations can occur in the drawn carbon nanotube film 100 for the reason that carbon nanotubes are relatively curved, and clearances can be defined by adjacent carbon nanotubes. In the carbon nanotube film 100, a plurality of carbon nanotubes is joined end-to-end by van der Waals attractive force therebetween and aligned along a same direction, and some of carbon nanotubes include curved portions. The carbon nanotube film 100 is a freestanding film. A thickness of the carbon nanotube film 100 can range from about 0.5 nanometers to about 100 micrometers. The single carbon nanotube film 100 can have a specific surface area above about 100 m²/g (BET testing method).

The carbon nanotube film 100 can be formed by the following steps:
S111 providing a carbon nanotube array; and
S112 pulling/drawing out a carbon nanotube film 100 from the carbon nanotube array using a pulling/drawing tool (e.g., adhesive tape, pliers, tweezers, or another tool allowing multiple carbon nanotubes to be gripped and pulled simultaneously).

In step S111, a given carbon nanotube array can be formed by a chemical vapor deposition (CVD) method. The carbon nanotube array is formed on a substrate, and includes a plurality of carbon nanotubes substantially perpendicular to the surface of the substrate. The carbon nanotubes together form an array on the surface of the substrate. The carbon nanotube array is essentially free of impurities such as carbonaceous or residual catalyst particles. The carbon nanotubes in the carbon nanotube array are closely packed together by van der Waals attractive force. The length of the carbon nanotubes can be approximately 50 microns to approximately 5 millimeters. In one embodiment, the length of the carbon nanotubes can range from about 100 microns to about 900 microns.

In step S112, the carbon nanotube film 100 can be pulled/drawn out from the carbon nanotube array by the following substeps: S112a selecting a carbon nanotube segment having a predetermined width from the carbon nanotube array; and S112b pulling the carbon nanotube segment at an even/uniform speed to achieve a uniform carbon nanotube film 100.

In step S112a, the carbon nanotube segment having a predetermined width can be selected by using an adhesive tape such as the pulling/drawing tool to contact the carbon nanotube array. The carbon nanotube segment includes a plurality of carbon nanotubes substantially parallel to each other. In step S112b, the pulling direction is arbitrary (e.g., substantially perpendicular to the growing direction of the carbon nanotube array).

Figure 4:
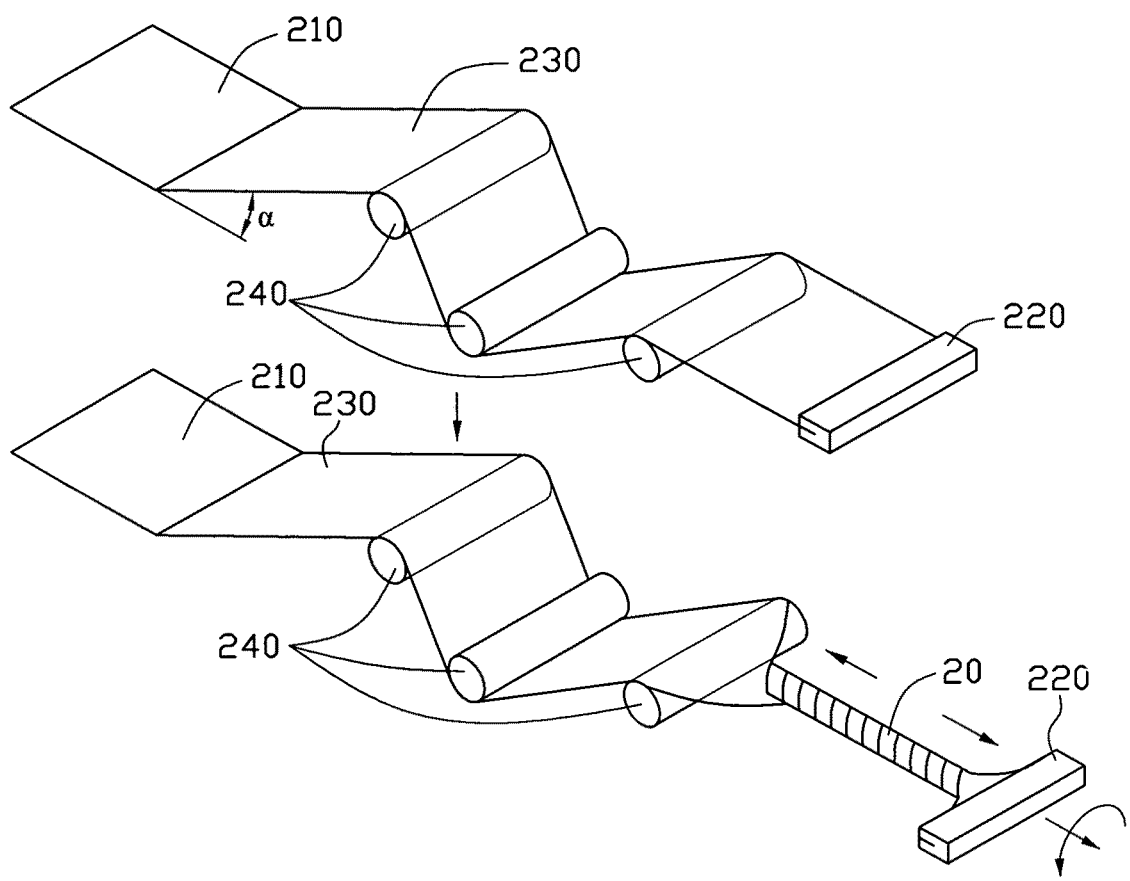
FIG. 4 is a schematic structural view of a second embodiment of a method for making a twisted carbon nanotube wire.

More specifically, during the pulling process, as the initial carbon nanotube segments are drawn out, other carbon nanotube segments are also drawn out end-to-end due to the van der Waals attractive force between ends of adjacent segments. In general, the initially selected carbon nanotubes are drawn out from the carbon nanotube array by the movement of the drawing tool. The following carbon nanotubes that are adjacent to the initially selected carbon nanotubes are then drawn out by van der Waals attractive force between the following carbon nanotubes and the initially selected carbon nanotubes thereby forming the carbon nanotube film 100 with carbon nanotubes joined end-to-end by van der Waals attractive force therebetween. This process of drawing ensures that a continuous, uniform drawn carbon nanotube film 100 having a predetermined width can be formed. Referring to FIG. 4, the drawn carbon nanotube film 100 includes a plurality of carbon nanotubes joined end-to-end. The carbon nanotubes in the drawn carbon nanotube film 100 are all substantially parallel to the pulling/drawing direction of the carbon nanotube film 100, and the carbon nanotube film 100 produced in such manner can be selectively formed to have a predetermined width. The width of the carbon nanotube film 100 depends on a size of the carbon nanotube array. The length of the carbon nanotube film 100 can be arbitrarily set as desired and can be above 100 meters. When the carbon nanotube array is grown on a 4-inch P-type silicon wafer, as in the present embodiment, the width of the carbon nanotube film 100 can range from about 0.01 centimeters to about 10 centimeters, and the thickness of the carbon nanotube film 100 can range from about 0.5 nanometers to about 100 microns.

It is to be noted that during the drawing process, the carbon nanotubes in the carbon nanotube array are continuously drawn out to form the carbon nanotube film 100, and therefore, the size of the carbon nanotube array continuously decreases. In the length direction, one end of the carbon nanotube film 100 is clamped by the pulling/drawing tool, and the other end of the carbon nanotube film 100 is connected with the carbon nanotube array. When all the carbon nanotubes in the carbon nanotube array are drawn out, or when the carbon nanotube array cannot provide enough van der Waals attractive force to hold the carbon nanotube film 100, the carbon nanotube film 100 is separated from the carbon nanotube array. During the drawing process, a cutting step can also separate the carbon nanotube film 100 from the carbon nanotube array by using, for example, a laser or mechanical force to cut off the carbon nanotube film 100.

In step S11, an additional step of stacking more than one carbon nanotube film 100 together along the same direction can be further processed. When more than one carbon nanotube film 100 are stacked with each other along the same direction, the carbon nanotubes in all of the carbon nanotube films 100 are substantially aligned along a same direction. The carbon nanotube film 100 has a large specific surface area, and thus, the carbon nanotube film 100 is adhesive in nature. Therefore, by contacting each other, the carbon nanotube films 100 are combined together by van der Waals attractive force therebetween, and a stable carbon nanotube structure can be achieved and formed into the twisted carbon nanotube wire in the following steps. The twisted carbon nanotube wire having a plurality of carbon nanotube films 100 therein can withstand a stronger pulling force.

In step S12, the fixing elements 120 can have the same structure as the pulling/drawing tool. The fixing elements 120 can be adhesive tapes, pliers, tweezers, or clamps. In one embodiment, the fixing elements 120 are rectangular clamps having two opposite openings to receive and clamp the two opposite ends of the carbon nanotube film 100 in the length direction of the carbon nanotube film 100. Thus, the carbon nanotubes in the carbon nanotube film 100 are substantially aligned along a direction from one fixing element 120 to the other fixing element 120.

In step S13, the two fixing element 120 are pulled along directions deviated from each other along the length direction of the carbon nanotube film 100. The carbon nanotubes are aligned substantially along the direction of the two pulling forces. Therefore, most of the curved carbon nanotubes are pulled straight under the pulling forces, and the clearances between two adjacent carbon nanotubes are decreased. The pulling force is sufficiently large to straighten the curved portions of carbon nanotubes to be relatively straight. The pulling forces are related to the width of the carbon nanotube film 100. In one embodiment, the value of the pulling forces (F) and the width (W) of the carbon nanotube film 100 satisfy the relationship of 0.005 Newtons/centimeter (N/cm)<F/W<0.02 N/cm such that the carbon nanotube film cannot be broken in the process.

In step S14, the two fixing elements 120 are rotated in opposite directions thereby twisting the carbon nanotube film 100 therebetween. The rotation directions are substantially perpendicular to the length direction of the carbon nanotube film 100. Alternatively, one fixing element 120 can be still or fixed, while the other fixing element 120 is rotated. In other embodiments, the fixing elements 120 can be fixed on a rotating machine to rotate simultaneously. The number of rotations of the fixing element 120 is related to the length of the carbon nanotube film 100. In one embodiment, a one meter carbon nanotube film 100 is twisted about 1000 to about 1500 times.

During rotation, the two fixing element 120 should also provide the pulling forces to the carbon nanotube film 100, thereby making the carbon nanotubes straight during rotation.

Compared to prior art methods that draw a carbon nanotube film and directly twist the carbon nanotube film simultaneously, the fixing elements 120 can provide a greater pulling force than the carbon nanotube array, thereby straightening the carbon nanotubes in the carbon nanotube film 100. The straightened carbon nanotubes can decrease the clearances therebetween, thereby increasing the density and tensile strength of the achieved twisted carbon nanotube wire 10.

It is to be noted that the present method can also include a step S15 of removing the fixing elements 120 from the twisted carbon nanotube wire 10. For example, the twisted carbon nanotube wire 10 can be cut off from the two fixing elements 120.

It is to be noted that the present method can also includes a step of treating the twisted carbon nanotube wire 10 with an organic solvent, thereby increasing the density and decreasing the diameter of the twisted carbon nanotube wire 10. The specific surface area of the carbon nanotube wire 10 is decreased, and thus the viscosity is decreased.

It is understood that the organic solvent treating step can be processed between step S13 and step S14 or before step S13, to treat the carbon nanotube film 100. A similar result as being processed after step S14 to treat the twisted carbon nanotube wire 10 can be achieved.

Referring to FIG. 4, according to a second embodiment, a method for making a twisted carbon nanotube wire 20 includes steps of:

S21 providing at least one carbon nanotube array 210, and drawing/pulling a carbon nanotube film 230 from the at least one carbon nanotube array 210 by using a drawing tool 220;

S22 contacting and supporting the carbon nanotube film 230 by at least one support cylinder 240;

S23 pulling the drawing tool 220 thereby applying two pulling forces on the carbon nanotube film 230 along the direction of the carbon nanotube film 230; and S24 rotating the drawing tool 220, thereby twisting the carbon nanotube film 230 while the carbon nanotube film 230 is at a stretched state.

The step S21 is similar to the step S11, however, the carbon nanotube film 230 is still in the drawing period and joined with the carbon nanotube array 210. In the length direction, one end of the carbon nanotube film 230 is connected with the carbon nanotube array 210 by van der Waals attractive force, and the other end is held by the drawing tool 220. The section of the carbon nanotube film 100 between the drawing tool 220 and the carbon nanotube array 210 is suspended. The carbon nanotubes are substantially aligned along the pulling direction (length direction).

In step S22, the support cylinder 240 is a cylinder fixed in place to support the carbon nanotube film 230 and applies a normal force on the carbon nanotube film 230. If it is necessary to adjust tension applied to the carbon nanotube film 110, the cylinder 240 can be made to rotate/roll in place. The surface of the support cylinder 240 is relatively smooth but still exerts friction. The carbon nanotube film 230 can be still or moved on the support cylinder 240. The length of the support cylinder 240 is equal to or longer than the width of the carbon nanotube film 230. When contacting the surface of the support cylinder 240, the width of the carbon nanotube film 230 is not changed. The carbon nanotube film 230 can contact the surface of the support cylinder 240 when the support cylinder 240 is arranged at a higher level than the carbon nanotube array 210. The carbon nanotube film 230 can also contact the bottom surface of the support cylinder 240 when the support cylinder 240 is arranged at a lower level than the carbon nanotube array 210. In one embodiment, the axis direction of the support cylinder 240 is substantially parallel to the top surface of the carbon nanotube array 210 and substantially perpendicular to the pulling direction of the carbon nanotube film 230.

It is to be noted that more than one support cylinder 240 can be used, and arranged to contact different positions of the carbon nanotube film 230. The sections of the carbon nanotube film 230 between the adjacent support cylinder 240 are suspended. The level of the support cylinders 240 can be changed alternatively, thereby applying normal forces to the carbon nanotube film 230 at different positions.

Figure 5:
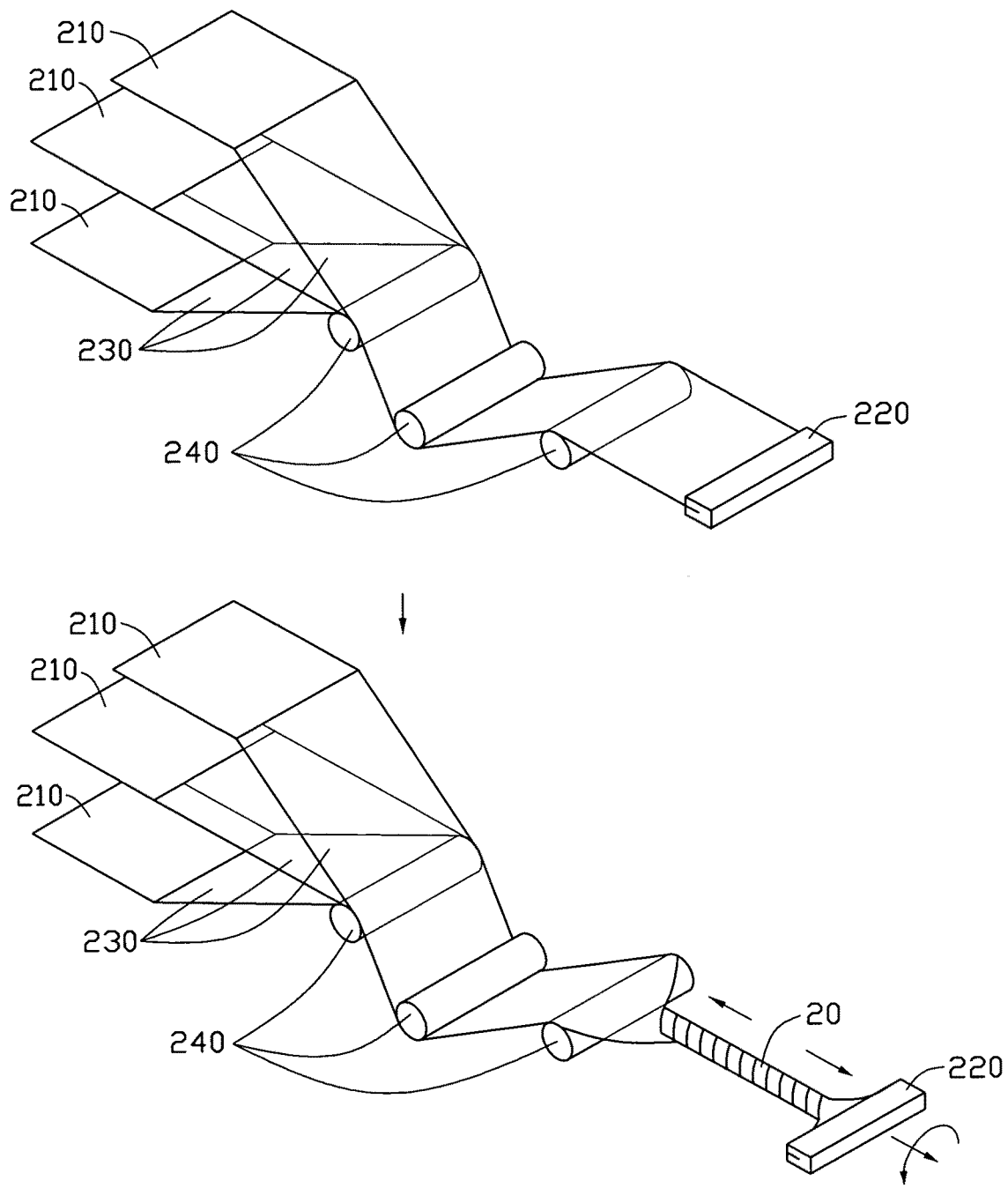
FIG. 5 is a schematic structural view of the second embodiment of the method for making the twisted carbon nanotube wire by drawing from more than one carbon nanotube array.

It is to be understood that more than one carbon nanotube film 230 can be stacked with each other. Referring to FIG. 5, the stacking step can be processed during the drawing step, and include steps of: drawing more than one carbon nanotube film 230 from more than one carbon nanotube arrays; and contacting and supporting the carbon nanotube films 230 by one support cylinder 240, so that the carbon nanotube films 230 are stacked on the support cylinder 240 and combined together to form a stable carbon nanotube structure.

In step S23, by pulling the drawing tool 220, more and more carbon nanotubes can be drawn out from the carbon nanotube array 210 and the length of the carbon nanotube film 230 can be extended. The carbon nanotube film 230 experiences a normal force by the support cylinder 240, and a friction force from the surface of the support cylinder 240. Therefore, when pulling the drawing tool 220, a pulling force is applied on the carbon nanotube film 230 by the drawing tool 220 and a kinetic friction force is applied on the carbon nanotube film 230 by the support cylinder 240, both of which are substantially parallel to the surface of the carbon nanotube film 230 and having opposite directions. The greater the normal force, the greater the kinetic friction force applied on the carbon nanotube film 230. By arranging the support cylinder 240 at different levels, such as a higher or lower level, a greater normal force and a greater kinetic friction force can be applied on the carbon nanotube film 230. By using more than one support cylinder 240, a greater resultant force of the kinetic friction forces can be applied on the carbon nanotube film 230.

The carbon nanotube film 230 is joined to the carbon nanotube array 210 by van der Waals attractive force, but the force is relatively weak. Therefore, the nearest support cylinder 240 arranged to the carbon nanotube array 210 can be arranged at a position higher or lower than the top surface of the carbon nanotube array 210. As shown in FIG. 4, the position has an angle α with the top surface of the carbon nanotube array 210 less than about 30 degrees (i.e., an angle α between the portion of carbon nanotube film 230 nearest to the carbon nanotube array 210 and the top surface of the carbon nanotube array 210 is smaller than 30 degrees).

It is to be understood that, even by using a single support cylinder 240, the support cylinder 240 can also provide a kinetic friction force larger than the van der Waals attractive force provided by the carbon nanotube array 210. Therefore, almost all the carbon nanotubes in the carbon nanotube film 230 can be straightened under the action of the pulling force of the drawing tool 220 and the kinetic friction force of the support cylinder 240.

The friction force applied by the support cylinder 240 on the carbon nanotube film 230 should not be too great that it can break the carbon nanotube film 230 or too small to fail straightening the carbon nanotubes. The value of the force is related to the width of the carbon nanotube film 230. In one embodiment, the value of the kinetic friction force (F) and the width (W) of the carbon nanotube film 230 satisfy $0.005 \text{ N/cm} < F/W < 0.02 \text{ N/cm}$.

It is to be understood that when the pulling force applied by the drawing tool 220 is smaller than the kinetic friction force or the resultant of the kinetic friction forces, the carbon nanotube film 230 is not move and not extended. However, the carbon nanotubes in the carbon nanotube film 230 can also be straightened by the applied forces.

In step S24, the rotating direction of the drawing tool 220 is substantially perpendicular to the length direction of the carbon nanotube film 230. Different from the first embodiment, the support cylinder 240 does not rotate to twist the film 230. It is to be noted that while rotating the drawing tool 220, the pulling force is still applied on the carbon nanotube film 230, and the carbon nanotubes are twisted while in the straightened state. Further, during steps S23 and S24, by pulling the drawing tool 220, more and more carbon nanotubes can be drawn from the carbon nanotube array 210 to extend the length of the carbon nanotube film 230.

More specifically, the drawing tool 220 can be fixed on a rotating machine. In other embodiments, the carbon nanotube film 230 is twisted by the rotating machine and the achieved twisted carbon nanotube wire 20 can go through the rotating machine and be wound onto a bobbin (not shown). The rotating machine and the bobbin can be coaxially arranged. The rotating machine can have a portion where the twisted carbon nanotube wire 20 can go through. The rotating machine and the bobbin can both rotate along the co-axis thereof. The rotating machine is capable of twisting the carbon nanotube film 230, and the bobbin is capable of winding the twisted carbon nanotube wire 20 thereon. Initially, the rotating machine and the bobbin can rotate at the same speed to achieve enough rotation circles of the twisted carbon nanotube wire 20. Then, the bobbin can rotate faster or slower than the rotating machine, and thus, the twisted carbon nanotube wire 20 are moved forward with respect to the rotating machine and winded on the bobbin.

When drawing more than one carbon nanotube film 230 from more than one carbon nanotube array 210 at the same time, the stacked carbon nanotube films 230 are rotated together to form a twisted carbon nanotube wire 20 with a larger diameter and greater tensile strength.

Figure 6:
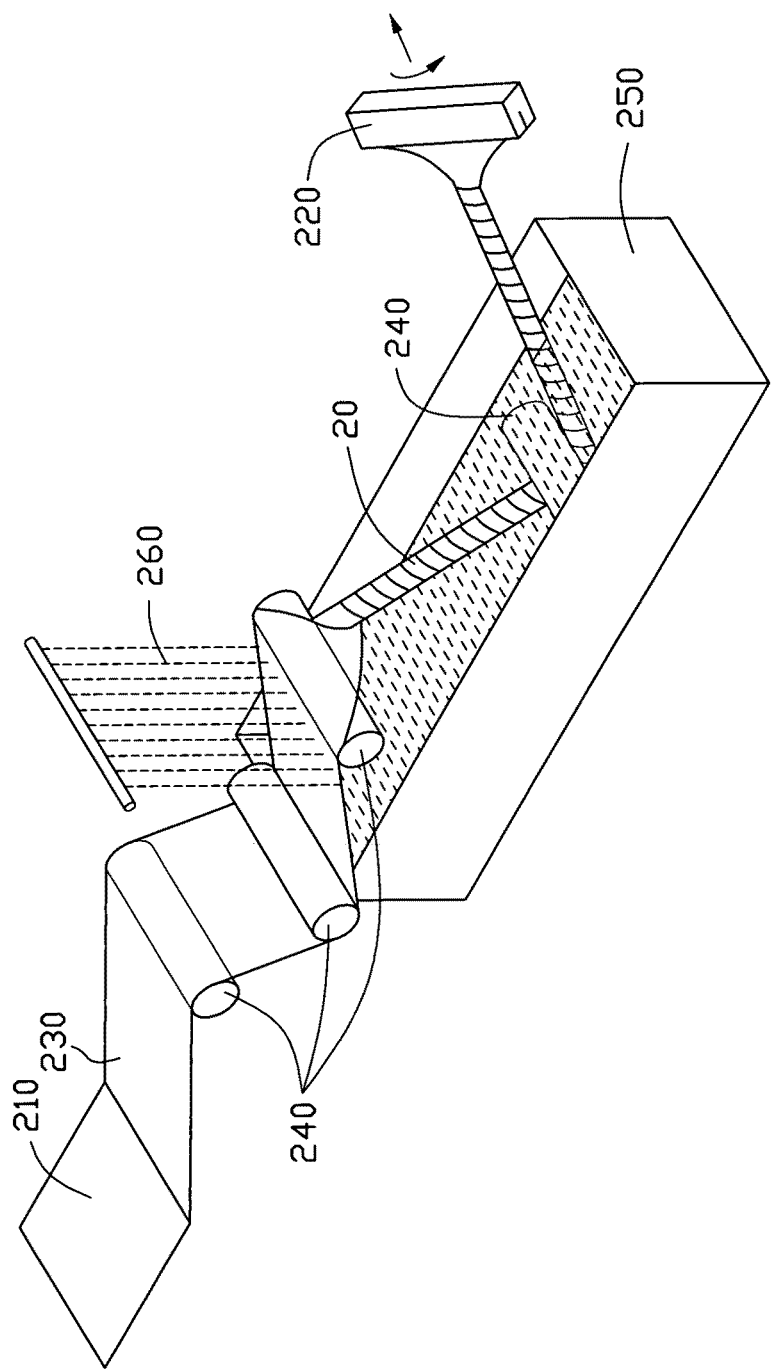
FIG. 6 is a schematic structural view of the second embodiment of a step of organic solvent treatment.

Similar to the first embodiment, the twisted carbon nanotube wire 20 can be treated with an organic solvent 260. Referring to FIG. 6, a container (not shown) with an opening at the bottom thereof can be disposed above the carbon nanotube film 230, and the organic solvent 260 disposed in the container can be dropped through the opening onto the carbon nanotube film 230. The organic solvent 260 can be dropped onto the carbon nanotube film 230 between the carbon nanotube array 210 and the nearest support cylinder 240, or between the support cylinder 240 and the drawing tool 220. In other embodiments, a container 250 with an opening in the top (e.g., a basin) can be disposed below the twisted carbon nanotube wire 20. The organic solvent 260 can be disposed in the container 250. One of the support cylinders can be disposed in the container 250 and the twisted carbon nanotube wire 20 guided through and soaked by the organic solvent 260 in the container 250.

Figure 7:
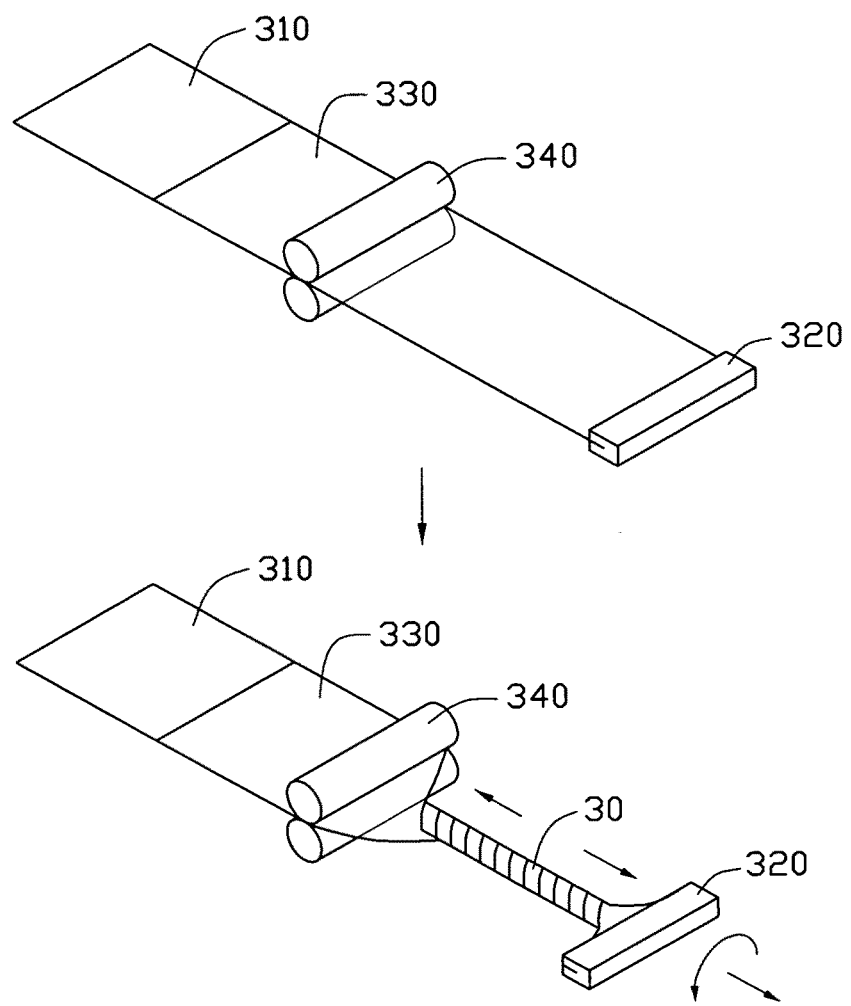
FIG. 7 is a schematic structural view of a third embodiment of a method for making a twisted carbon nanotube wire.

Referring to FIG. 7, according to a third embodiment, a method for making a twisted carbon nanotube wire 30 includes steps of:

S31 providing at least one carbon nanotube array 310, and drawing/pulling a carbon nanotube film 330 from the at least one carbon nanotube array 310 by using a drawing tool 320;

S32 pressing the carbon nanotube film 330 by at least one pressing member 340;

S33 pulling the drawing tool 320 thereby applying two different direction pulling forces on the carbon nanotube film 330 along the direction of the carbon nanotube film 330; and S34 rotating the drawing tool 320 thereby twisting the carbon nanotube film 330 while the carbon nanotube film 330 is at a stretched state.

The step S31 can be the same as the step of S21.

In step S32, the pressing member 340 sandwiches the carbon nanotube film 330 and applies a pressure and friction to the carbon nanotube film 330 as it travels through the pressing member 340. The pressing member 340 can press the carbon nanotube film 330 from the opposite surface of the carbon nanotube film 330, and applies a pressing force on the carbon nanotube film 330. In one embodiment, the pressing member 340 can be a pair of columns with a length equal to or larger than the width of the carbon nanotube film 330. The axis of the two columns are substantially parallel with each other. The carbon nanotube film 330 can move between the two columns, and the width of the carbon nanotube film 330 is not changed. It is to be understood that, more than one pressing member 340 can be adopted to clamp the carbon nanotube film 330 at different positions. The two or more pressing member 340 can be arranged at the same level as the top surface of the carbon nanotube array 310, and the moving direction of the carbon nanotube film 330 not changed by the pressing member 340.

In one embodiment, the axis direction of the column is substantially parallel to the top surface of the carbon nanotube array 310 and substantially perpendicular to the pulling direction of the carbon nanotube film 330.

Similar to the second embodiment, in step S32, more than one carbon nanotube film 330 with one end thereof connecting with the carbon nanotube array 310 can go through the same pressing member 340 together, and be stacked with each other to form the stable carbon nanotube structure.

In step S33, by pulling the drawing tool 320, more and more carbon nanotubes are drawn out from the carbon nanotube array 310 and the length of the carbon nanotube film 330 is extended. A pressing force is applied on the carbon nanotube film 330 by the pressing member 340, and a surface of the pressing member 340 has a coefficient of static friction. Therefore, when pulling the drawing tool 320, a pulling force is applied on the carbon nanotube film 330 by the drawing tool 320 and a kinetic friction force is applied on the carbon nanotube film 330 by the pressing member 340. The greater the pressing force, the greater the kinetic friction force applied on the carbon nanotube film 330. By using more than one pressing member 340, a greater resultant force of the kinetic friction forces can be applied on the carbon nanotube film 330.

The carbon nanotube film 330 is joined to the carbon nanotube array 310 by van der Waals attractive force but the force is relatively weak. It is to be understood that, even by using a single pressing member 340, the surface thereof still provides a kinetic friction force larger than the van der Waals attractive force provided from the carbon nanotube array 310 as the film slides across the pressing member 340. Therefore, almost all the carbon nanotubes in the carbon nanotube film 330 can be straightened under the action of the pulling force of the drawing tool 320 and the kinetic friction force of the pressing member 340.

The friction force applied by the pressing member 340 on the carbon nanotube film 330 should not be too great to break the carbon nanotube film 330 and should not be too small to not straighten the carbon nanotubes. The value of the force is related to the width of the carbon nanotube film 330. In one embodiment, the value of the kinetic friction force (F) and the width (W) of the carbon nanotube film 330 is satisfied by a relation of 0.005 Newton/centimeter<F/W<0.02 Newton/centimeter.

It is to be understood that when the pulling force applied by the drawing tool 320 is smaller than the kinetic friction force or the resultant of the kinetic friction forces, the carbon nanotube film 330 does not move and not extended. However, the carbon nanotubes in the carbon nanotube film 330 can also be straightened by the applied forces.

The step S34 can be the same as the step of S24. When stacking more than one carbon nanotube film 330 together, the achieved carbon nanotube structure is twisted, and the twisted carbon nanotube wire 30 with a larger diameter and greater tensile strength is achieved. It is to be noted that, similar to the second embodiment, the carbon nanotube film 330 and/or the carbon nanotube twisted wire 30 can be further treated with an organic solvent.

Figure 8:
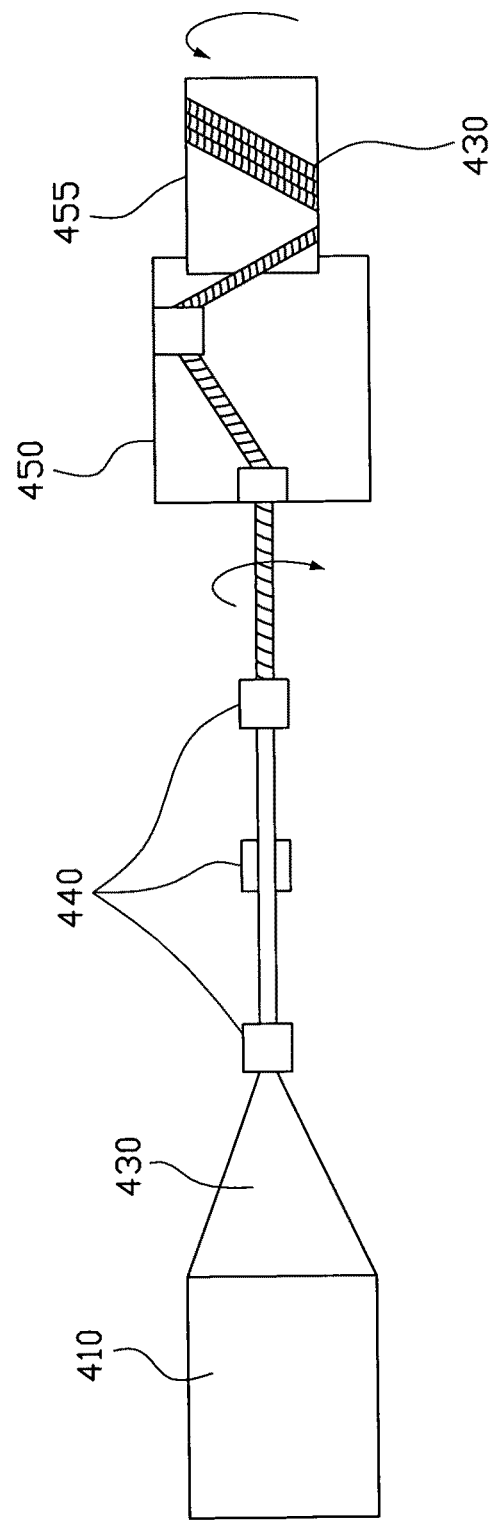
FIG. 8 is a schematic top view of a fourth embodiment of a method for making a twisted carbon nanotube wire.

Referring to FIG. 8, according to a fourth embodiment, a method for making a twisted carbon nanotube wire 40 includes steps of:

S41 providing at least one carbon nanotube array 410, and drawing/pulling a carbon nanotube film 430 from the at least one carbon nanotube array 410 by using a drawing tool 420;

S42 contacting and supporting the carbon nanotube film 430 by a convergence member 440;

S43 pulling the drawing tool 420 thereby applying two pulling forces on the carbon nanotube film 430 along the direction of the carbon nanotube film 430; and S44 rotating the drawing tool 420 thereby twisting the carbon nanotube film 430 while the carbon nanotube film 430 is at stretched state.

The step S41 can be the same as the step of S21.

In step S42, the convergence member 440 supports the carbon nanotube film 430 and applies a normal force on the carbon nanotube film 430. Further, the convergence member 440 can cause the carbon nanotube film 430 to narrow as it passes through. That is, when going on the surface of the convergence member 440, the carbon nanotube film 430 is narrowed. More specifically, the convergence member 440 can be a ring or a hook. The carbon nanotube film 430 is narrowed when going through the ring or the hook. The arrangement of the convergence member 440 is similar to that of the support cylinder 240 in the second embodiment, thereby providing a normal force to the carbon nanotube film 430. It is to be noted that more than one convergence member 440 can be used.

It is to be understood that, similar to the second embodiment, more than one carbon nanotube film 430 can go through the same convergence member 440 to combine with each other and form a stable carbon nanotube structure. In other embodiments, more than one carbon nanotube film 430 can also be stacked together and converged by the convergence member 440.

In step S43, similar to the second embodiment, by pulling the drawing tool 420, more and more carbon nanotubes are drawn out from the carbon nanotube array 410 and the carbon nanotube film 430 is extended. Further, almost all the carbon nanotubes in the carbon nanotube film 430 can be stretched straight under the action of the pulling force of the drawing tool 420 and the kinetic friction force of the convergence member 440.

The friction force applied by the convergence member 440 on the carbon nanotube film 430 should not be too great to break the carbon nanotube film 430 and not be too small to fail straightening the carbon nanotubes. The value of the force is related to the width of the carbon nanotube film 430. In one embodiment, the value of the kinetic friction force (F) and the width (W) of the carbon nanotube film 430 is satisfied by a relation of 0.005 Newton/centimeter<F/W<0.02 Newton/centimeter.

It is to be understood that when the pulling force applied by the drawing tool 420 is smaller than the kinetic friction force or the resultant of the kinetic friction forces, the carbon nanotube film 430 does not move and is not extended. However, the carbon nanotubes in the carbon nanotube film 430 can also be straightened by the applied forces.

The step S44 can be the same as the step of S24. Further, referring to FIG. 8, the twisted carbon nanotube wire 40 can be rotated by a rotating machine 450 and can go through the rotating machine 450 and winded on a bobbin 455. The rotating machine 450 and the bobbin 455 can be coaxially arranged. The rotating machine 450 can have a portion where the twisted carbon nanotube wire 40 can go through. The rotating machine 450 and the bobbin 455 can both rotate along the axis thereof. The rotating machine 450 is capable of twisting the carbon nanotube film 430, and the bobbin 455 is capable of winding the twisted carbon nanotube wire 40 thereon.

The method for making the twisted carbon nanotube wire 40 can include steps of: attaching the end that is connected with the drawing tool 420 to the bobbin 455 through the rotating machine 450; rotating the rotating machine 450 and the bobbin 455 at the same speed to achieve enough rotation of the twisted carbon nanotube wire 40; and rotating the rotating machine 450 faster or slower than the bobbin 455, so that the twisted carbon nanotube wire 40 is moved forward and wound on the bobbin. The rotating machine 450 and the bobbin 455 can be powered by an engine, and the rotating speeds thereof can be adjusted. In one embodiment, the pitch of the twisted carbon nanotube wire 40 can be larger than 1 mm/turn. The greater the pitch of the twisted carbon nanotube wire 40, the greater the tensile strength of the twisted carbon nanotube wire 40. It is to be understood that the method for rotating the rotating machine 450 and the bobbin 455 can also be used in the second and third embodiments.

When drawing more than one carbon nanotube film 430 from more than one carbon nanotube array 410 at the same time, the stacked carbon nanotube films 430 are rotated together to form a twisted carbon nanotube wire 40 with a larger diameter and greater tensile strength. Similar to the second embodiment, the carbon nanotube film 430 or the twisted carbon nanotube wire 40 can be treated with an organic solvent.

It is to be understood that, the twisted carbon nanotube wire can be formed by other methods if a force can be applied on the carbon nanotube film to straighten the carbon nanotubes therein before and during the twisting step.

Figure 9:
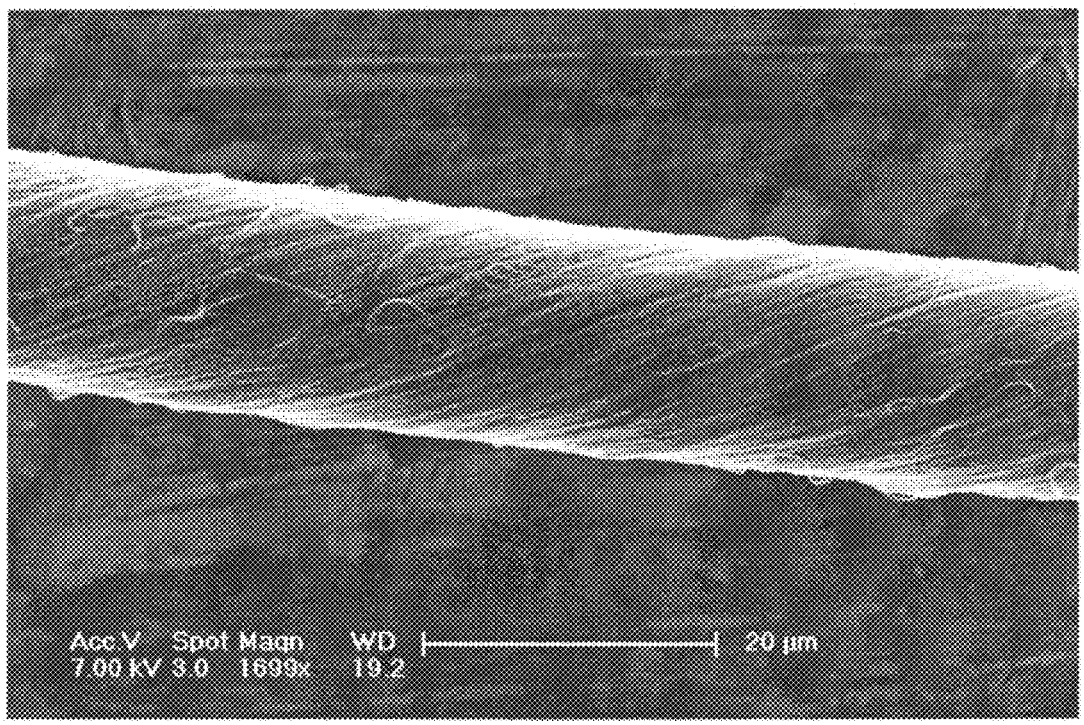
FIG. 9 shows an SEM image of a twisted carbon nanotube wire.

Referring to FIG. 9, a twisted carbon nanotube wire in one embodiment, includes a plurality of carbon nanotubes. More specifically, the plurality of carbon nanotubes in the twisted carbon nanotube wire is oriented around an axial direction of the twisted carbon nanotube wire. The carbon nanotubes are aligned around the axis of the twisted carbon nanotube wire like a helix and joined end to end by van der Waals attractive force therebetween. Length of the twisted carbon nanotube wire can be set as desired. The diameter of the twisted carbon nanotube wire can range from about 4.5 nanometers to about 100 micrometers.

The testing data of the twisted carbon nanotube wire reveal that when the twisted carbon nanotube wire is formed from a single carbon nanotube film, the resistivity of the twisted carbon nanotube wire can be in a range from about $1\times10^{-5}$ $\Omega\cdot m$ to about $2\times10^{-5} \Omega\cdot m$. In one embodiment, the resistivity is about $1.91\times10^{-5}$ $\Omega\cdot m$. Compared to the conventional method, the twisted carbon nanotube wire made by the invention has a higher density and a smaller cross-sectional area (decreasing of about 20% to about 40%). As the density increases, the resistivity of the twisted carbon nanotube wire can decrease by about 50%, and the maximum bearing force can increase by about 60% to about 120%. The tensile strength of the twisted carbon nanotube wire can be larger than 1200 MPa: In one embodiment, the tensile strength of the twisted carbon nanotube wire with a diameter of about 10 microns is about 1.5 GPa.

It is to be understood that the above description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a twisted carbon nanotube wire, the method comprising:
   providing at least one carbon nanotube film comprising a plurality of carbon nanotubes joined end-to-end by van der Waals attractive force therebetween and aligned along a same direction;
   fixing two opposite ends of the at least one carbon nanotube film to two fixing elements and pulling the two fixing elements along two reversed directions by a pulling force parallel to a surface of the at least one carbon nanotube film to stretch the at least one carbon nanotube film, a value of the pulling force (F) and a width (W) of the at least one carbon nanotube film is satisfied by a relation of 0.005 Newton/centimeter<F/W<0.02 Newton/centimeter; and
   twisting the at least one carbon nanotube film by rotating at least one of the two fixing elements while the at least one carbon nanotube film is still pulled by the pulling force.

2. The method of claim 1, wherein the at least one carbon nanotube film is obtained by: providing at least one carbon nanotube array, and drawing the at least one carbon nanotube film from the at least one carbon nanotube array.

3. The method of claim 1, wherein the two opposite ends of the at least one carbon nanotube film along the aligned direction of the plurality of carbon nanotubes are fixed by the two fixing elements, two of the pulling forces along the two reversed directions are applied on the fixing elements to stretch the at least one carbon nanotube film, the two reversed directions of the two of the pulling forces are substantially parallel to a surface of the at least one carbon nanotube film and parallel to the aligned direction of the plurality of carbon nanotubes.

4. A method for making a twisted carbon nanotube wire, comprising steps of:
   providing a carbon nanotube array;
   drawing a carbon nanotube film from the carbon nanotube array by using a drawing tool, wherein the carbon nanotube film is connected to the carbon nanotube array at a first end and connected to the drawing tool at a second end, the carbon nanotube film comprising a plurality of carbon nanotubes joined end-to-end by van der Waals attractive force therebetween and aligned along a same direction;
   passing a section of the carbon nanotube film by at least one supporting member during the drawing, the at least one supporting member being in direct contact with the carbon nanotube film during the passing of the section of the carbon nanotube film to apply a force on the section of the carbon nanotube film, the force being parallel to a surface of the section of the carbon nanotube film; and
   twisting only the section of the carbon nanotube film passed by the at least one supporting member while the carbon nanotube film is still connected to the carbon nanotube array at the first end and the force is still applied to the section of the carbon nanotube film.

5. The method of claim 4, wherein the twisting is processed during the drawing, during the passing and twisting more carbon nanotubes are still drawn from the carbon nanotube array to extend a length of the carbon nanotube film.

6. The method of claim 4, wherein two or more carbon nanotube films are drawn from two or more carbon nanotube arrays, the two or more carbon nanotube films are stacked with each other while contacting the supporting member.

7. The method of claim 4, wherein the at least one supporting member has a column configuration having a length equal to or larger than a width of the carbon nanotube film; the force is applied on the carbon nanotube film by pulling the drawing tool while a normal force is being applied on the carbon nanotube film by the at least one supporting member.

8. The method of claim 7, wherein more than one of the at least one supporting member is arranged to contact different positions of the carbon nanotube film.

9. The method of claim 7, wherein the at least one supporting member is arranged at a level above or below a top surface of the carbon nanotube array.

10. The method of claim 4, wherein the at least one supporting member comprises two substantially parallel columns having a length equal to or larger than a width of the carbon nanotube film; the force is applied on the carbon nanotube film by pulling the drawing tool while a pressing force is being applied on the carbon nanotube film by the two columns.

11. The method of claim 10, wherein two or more of the at least one supporting members are adopted to press the carbon nanotube film at different positions.

12. The method of claim 10, wherein the two or more of the at least one supporting members are arranged at the same level as a top surface of the carbon nanotube array.

13. The method of claim 4, further comprising a step of treating the twisted carbon nanotube wire with an organic solvent to decrease a diameter of the twisted carbon nanotube wire or a step of treating the carbon nanotube film with an organic solvent before the carbon nanotube film is twisted.

14. The method of claim 4, wherein a value of the force (F) and a width (W) of the carbon nanotube film is satisfied by a relation of 0.005 Newton/centimeter<F/W<0.02 Newton/centimeter.

15. A method for making a twisted carbon nanotube wire, comprising steps of:
providing a carbon nanotube array;
drawing a carbon nanotube film from the carbon nanotube array by using a drawing tool, wherein the carbon nanotube film is connected to the carbon nanotube array at a first end and connected to the drawing tool at a second end, the carbon nanotube film comprising a plurality of carbon nanotubes joined end-to-end by van der Waals attractive force therebetween and aligned along a same direction;
passing a section of the carbon nanotube film by at least one convergence member to narrow the section of the carbon nanotube film and to apply a force on the section of the carbon nanotube film during the drawing; and
twisting only the section of the carbon nanotube film passed by the at least one convergence member while the carbon nanotube film is still connected to the carbon nanotube array at the first end and the force is still applied to the section of the carbon nanotube film.

16. The method of claim 15, wherein the at least one convergence member is a ring or a hook, and the at least one convergence member is arranged at a higher level than the carbon nanotube array or at a lower level than the carbon nanotube array.

17. The method of claim 15, wherein during the drawing, passing and twisting steps, the carbon nanotube film is always connected to the carbon nanotube array at the one end, and continuously drawn from the carbon nanotube array to extend a length of the carbon nanotube film.

18. The method of claim 17, wherein the carbon nanotube film is twisted by:
providing a rotating machine and a bobbin coaxially arranged and capable of rotating, the rotating machine being capable of twisting the carbon nanotube film, and the bobbin being capable of winding the twisted carbon nanotube wire on the bobbin;
attaching the second end of the carbon nanotube film connected with the drawing tool to the bobbin through the rotating machine;
rotating the rotating machine and the bobbin at the same speed to achieve a predetermined rotation of the twisted carbon nanotube wire; and
rotating the rotating machine at a different speed than the bobbin, to wind the twisted carbon nanotube wire on the bobbin.

19. The method of claim 15, wherein a value of the force (F) and a width (W) of the carbon nanotube film is satisfied by a relation of 0.005 Newton/centimeter<F/W<0.02 Newton/centimeter.

* * * * *